Jan. 14, 1936.   R. W. BABSON   2,028,037
PARKING REGISTER
Filed Feb. 13, 1932     8 Sheets-Sheet 1

Fig. 5.

Jan. 14, 1936. R. W. BABSON 2,028,037
PARKING REGISTER
Filed Feb. 13, 1932 8 Sheets-Sheet 6

Inventor
Roger W. Babson

Inventor
Roger W. Babson
by Wright, Brown, Quinby & May
Attys.

Patented Jan. 14, 1936

2,028,037

UNITED STATES PATENT OFFICE 2,028,037

PARKING REGISTER

Roger W. Babson, Wellesley, Mass.

Application February 13, 1932, Serial No. 592,699

37 Claims. (Cl. 177—311)

This invention relates to apparatus or means for controlling the parking of vehicles, and particularly of automobiles in public places. In its general nature and purposes it is allied to other inventions which I have made and have disclosed in my previously filed and granted United States Patents No. 1,965,066, July 3, 1934, No. 1,973,275, September 11, 1934, and pending application filed April 11, 1931, Serial No. 529,419. Like the foregoing, the present invention provides signals or indicators for showing to public police officials, or attendants in charge of parking locations, whether or not an automobile is properly parked in accordance with prescribed regulations. In respect to the generic ideas embodied in means for causing a change of signals after lapse of a predetermined time, it is a continuation of the common subject matter disclosed in said prior applications; and in respect to a control element for such signal means located beside a parking berth and directly operated by a portion of a parked automobile, it is a continuation of the common subject matter in said application Serial No. 466,421. It contains a new feature consisting in means requiring a coin to be deposited and an operation performed by the motorist to put into effect the signal which shows that the car is properly and legally parked. That is, whereas my prior inventions were developed in devices applicable to situations where a limited free parking time is permitted and payment required for a stay beyond the free time, the present invention provides an apparatus adapted for use in situations where payment is exacted from the beginning. It therefore embodies a combined control for the signal showing the legally parked condition, one element of which control is operated by the car itself, and the other by a deposited coin and the cooperation of a person.

Another feature of the invention is a switch or signal controller adapted to be put into the signal governing condition by pressure applied through the bumper of an automobile, rather than by a road wheel thereof.

Still another feature of the invention is a means for making a permanent record of the parking of a car, or a series of cars, in a given parking berth.

The foregoing main characteristics of the invention, together with numerous accessories, in which other features of the invention are embodied and for which protection is sought hereby, are described in detail in the following specification in connection with the drawings.

In the drawings,—

Like reference characters designate the same parts wherever they occur in all the figures.

Figures 20, 21, 22, 23:
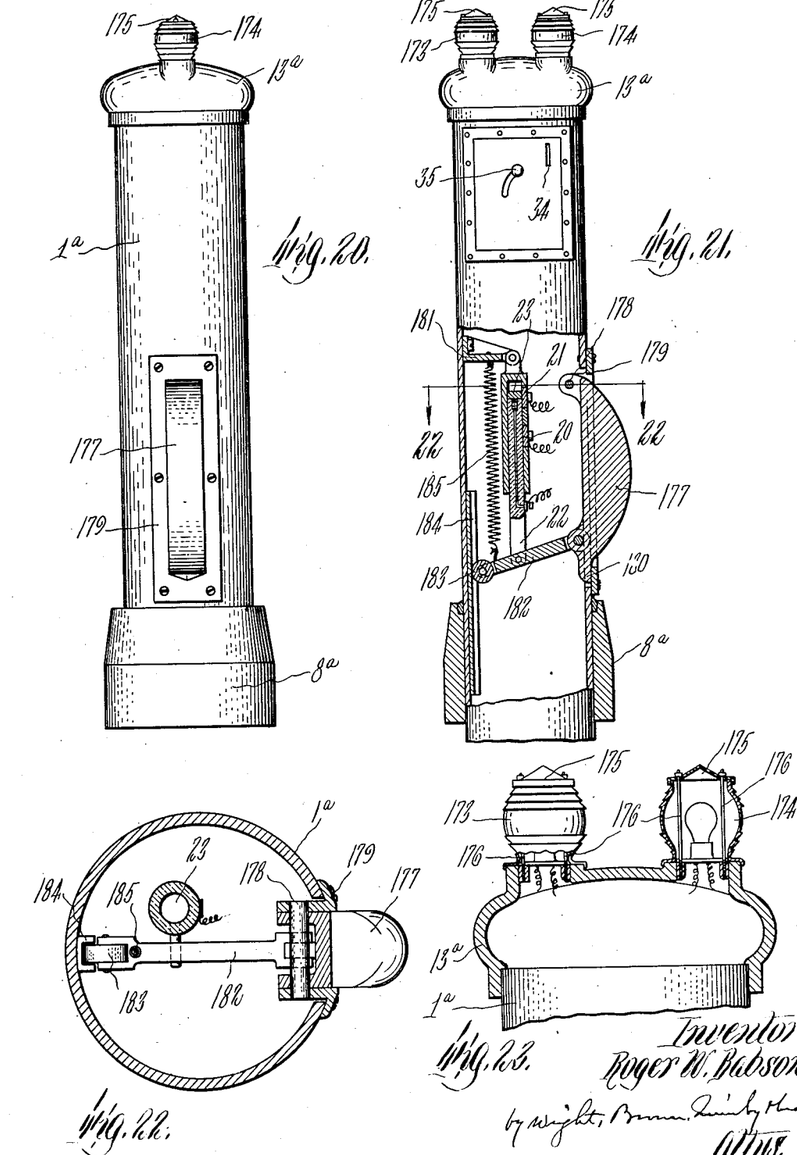
Figs. 20 and 21 are elevations and a partial section of a different form of post and switch actuator embodying the same inventions.
Fig. 22 is a cross section on line 22—22 of Fig. 21.
Fig. 23 is a vertical section of the top of this post.

One of the embodiments of the invention here shown for illustration (see Figs. 1–4) comprises a low post 1, comparable in dimensions to a water hydrant, which is set up on the sidewalk adjacent to a space in which parking of cars diagonal or square to the curb is permitted. On the side of the post is mounted an actuator 2, normally held in an outward position by a spring, and adapted to be pressed upon and pushed inward by the bumper 3 (which may be either the front or the rear bumper) of a parked automobile. In the illustration, the actuator 2 has the form of a door or shutter connected by hinges 5 to the body of the post and extending across an adjacent opening. It swings about a vertical axis, but could obviously be arranged to move in and out bodily without swinging. An alternative form, adapted to swing about a horizontal axis, is shown in Figs. 22–23 and later described. The form now being described is equipped with rollers 6 located at its outer edge and at intervals along its width to avoid rubbing or scraping and marring the automobile bumper, and also to avoid wear on the actuator itself. A massive ledge 7 is formed on the side of the post above the actuator as a guard to prevent operation of or injury to, the actuator by vehicles traveling close to the curb. The post is made adjustable so that its actuator element may be adapted for different conditions of parking; i. e., squarely to the curb or on a right or left hand inclination, wherefore its body part is made as a tube rotatably fitted in a base 8 which is mounted on or in the sidewalk curb. A ring 9 is supported freely on a ledge 10 on the inside of the body, and receives vertical bolts 11 which are anchored at their lower ends in the sidewalk. Nuts 12 on these bolts enable the ring to be clamped down so as to secure the post body, or to be released whereby angular adjustment of the body is permitted.

Figures 11, 12, 13:
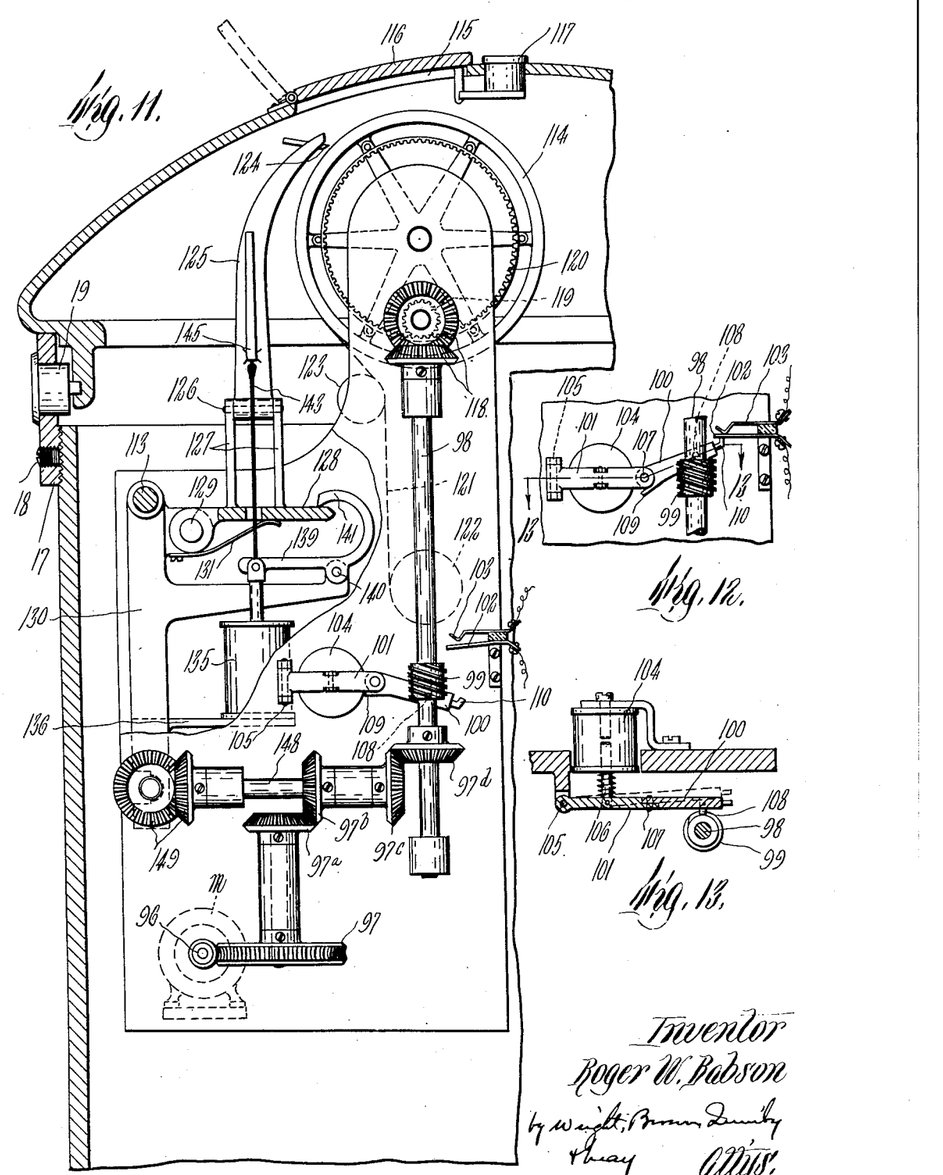
Fig. 11 is a fragmentary section of the post taken on line 11—11 of Fig. 3, showing the recording mechanism in elevation as seen from the right of Fig. 8.
Fig. 12 is an elevation in detail of the device which, at the end of a given time, changes the signal indication.
Fig. 13 is a cross section on line 13—13 of Fig. 12.

On the top of the body is a cover 13 in which are holes or windows covered by glass bull's-eyes 14 and 15, through which the light from electric signal lamps within the column is diffused. The cover 13 may be adjusted rotatably on the post, and also raised to give access to the interior, wherefore it is hinged at 16 to a ring 17 which is threaded on the upper end of the column and provided with a set screw 18 for locking it in any position. A lock 19 (Fig. 11) prevents opening of the cover by any one except an authorized person who holds the key to the lock.

While the broader aspects of the invention are not limited to specific signal devices, yet for practical reasons I prefer to use electric lights for that purpose, and specifically a green light to show that the car is correctly parked, and a red light to show that payment has not been made for the parking privilege in use. For the protection of these lamps they are preferably mounted in the post beneath the cover, as above stated, and the light emitting windows in the cover are closed by heavy glass bull's-eyes, or so-called jewels or targets, but evidently these details may be modified and departed from. The distinctive color effects of the lights may be given by the lamp bulbs or bull's-eyes or both.

Figures 1, 2:
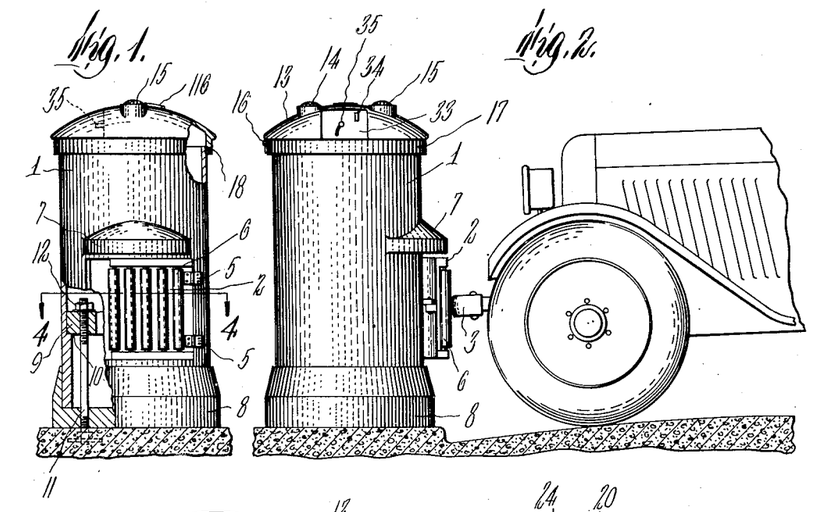
Fig. 1 is a front elevation, partly broken away and shown in section, of a post adapted to be mounted in position to be contacted with by the bumper of a parked automobile, and to contain the indicators, record and control means therefor.
Fig. 2 is a side elevation of the same showing the forward end of a parked car adjacent thereto.
Figure 3:
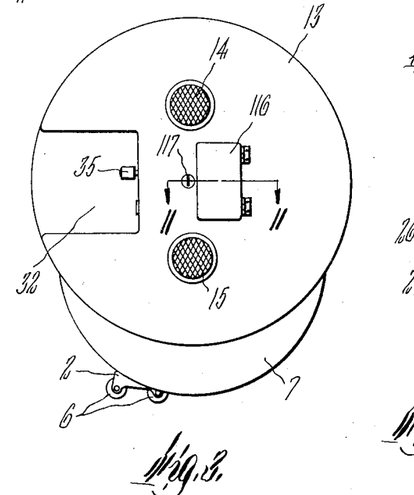
Fig. 3 is a plan view of the post on a somewhat larger scale.
Figure 4:
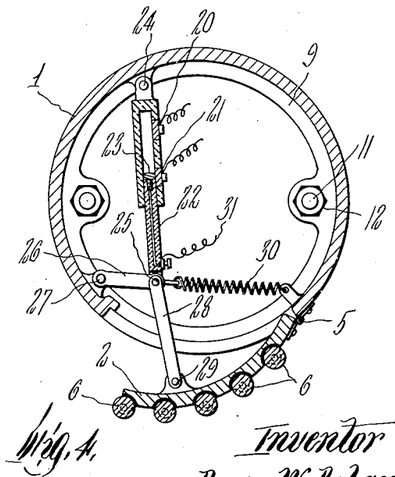
Fig. 4 is a horizontal section of the post taken on line 4—4 of Fig. 1.

When, as here shown, the controls are all electrical, the actuator 2 operates a main electric switch. A convenient form of switch and combination therewith of the actuator and spring for projecting the actuator is shown in Fig. 4. Here the switch consists of a guide of insulating material having separated contacts 20 and 21, and a telescopic slide 22, also of insulating material, carrying a complemental contact 23. The guide is pivoted at 24 to the body of the post and the slide is connected by a pivot 25 with a guide link 26, pivoted at 27 to the post, and with a connecting link 28 pivoted at 29 to the actuator. A spring 30 connected at opposite ends to the link 26 and to the post, normally holds the parts in the position shown in Fig. 4, where contact 23 is in engagement with contact 21. Movement of the actuator caused by a parked automobile shifts the contact 23 into engagement with the other complemental contact 20. Current for operating the mechanism is brought from a suitable source (such as the electric service supply of the community) to the contact 23 by a conductor 31 which is electrically connected thereto through a connection suitably insulated from contact 21. That is, the arrangement is such that the movable contact 23 may be brought exclusively into engagement with either of the complemental contacts.

Figure 5:
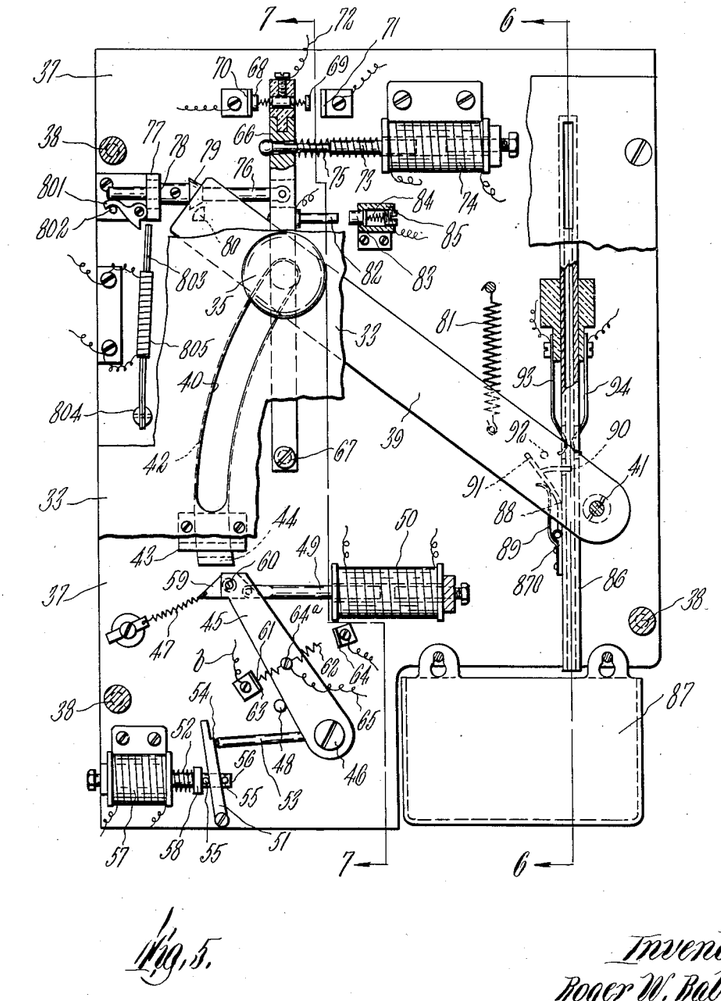
Fig. 5 is an elevation on a still larger scale of the signal controlling mechanism within the post.
Figure 6:
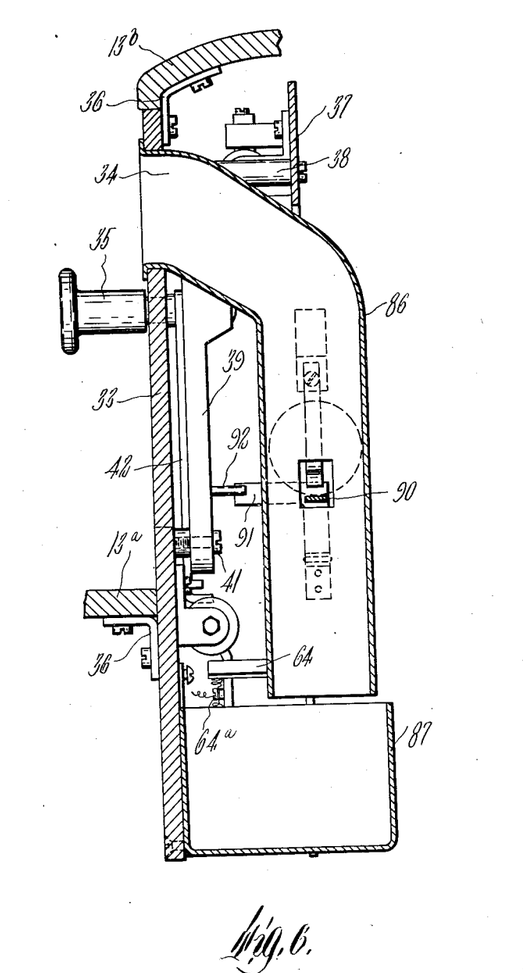
Figs. 6 and 7 are fragmentary vertical sections taken on lines 6—6 and 7—7, respectively of Fig 5.
Figure 7:
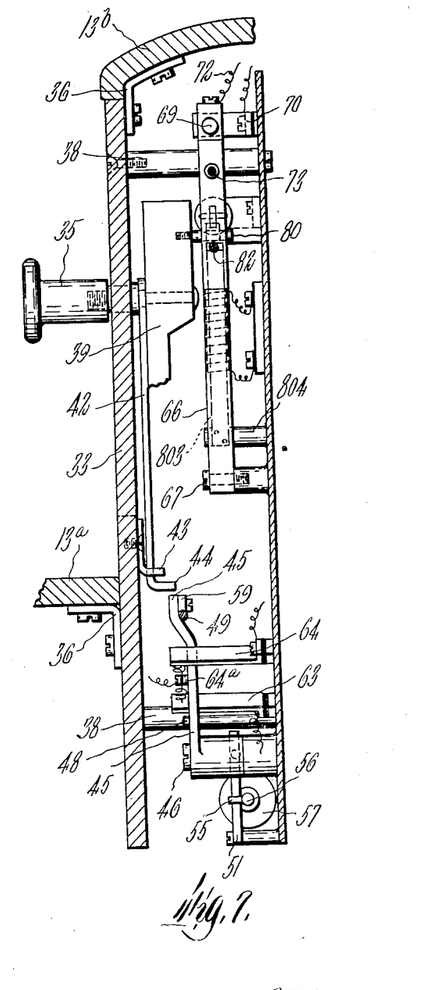

The cover of the post is recessed in one side at 32, and the inner boundary of the recess is formed by an upright wall 33 in which is a coin slot 34 and from which protrudes a handle or knob 35. These parts are best shown in Figs. 5, 6 and 7. The wall 33 is conveniently detachably secured to the contiguous parts 13a and 13b of the cover, (Figs. 6 and 7), by straps 36. A plate 37 is secured to the wall 33 at a distance therefrom by connecting and spacing posts 38, and screws. Knob 35 is secured to a lever 39 and projects through a slot 40 concentric with the pivot pin 41 which connects this lever to the wall 33. To the lever 39 is connected at one end, by the shank of handle 35, a curved bar 42 which is adapted to slide through a guide 43 on the wall 33 and has a stop lug or foot 44 on its free end. Normally this foot is obstructed by the adjacent end of a stop lever 45, pivoted at 46 to the plate 37 and normally held in obstructing position by a spring 47, which holds the stop lever against a stationary stop pin 48 on plate 37. Lever 45 is also connected to the core 49 of a solenoid 50 in such manner that the latter, when energized, withdraws the lever from its obstructing relationship to the bar 42. When lever 45 is thus withdrawn or displaced, it is held so by a latch 51 which is pressed by a spring 52 against the end of an abutment 53 on lever 45, such abutment being so moved by retraction of the lever as to pass by a shoulder 54 on the latch, and allow such shoulder to be snapped under the abutment by spring 52. Latch 51 is coupled, as shown in Fig. 5, by studs 55 with a bar 56 which may be part of, or attached to, the core of a solenoid 57; and spring 52 is conveniently arranged as a helical coil surrounding said core and compressed between a collar 58 thereon and the solenoid spool.

Connection is made between lever 45 and its operating members (spring 47 and solenoid core 49) by means of a plate or strap 59 pivoted to the lever by a stud 60, and to the opposite ends of which the core and spring respectively are pivoted. This mode of connection allows the solenoid core to travel in a straight line notwithstanding the movement of the lever in a curved path. Circuit closing contacts 61 and 62 are carried by lever 45 and are preferably in the form of spring wires helically coiled, the ends of which form the contact elements proper and are designed to engage stationary contacts 63 and 64 respectively. Such spring contact elements are secured to the lever by a screw 64a to which a lead conductor 65 is fastened. Their function is to open the circuit of a signal-changing solenoid presently described and close a gap in the circuit of solenoid 57, so that the latter may be operated by the closing of another switch in its circuit to unlock the latch 51.

A signal controlling switch arm 66 is pivoted at 67 on the plate 37 and carries two oppositely disposed spring protruded contacts 68 and 69 which are adapted to engage stationary contacts 70 and 71 respectively, according as the arm is held in one or the other of its two operative positions. Said contacts 68 and 69 are coupled electrically with a lead conductor 72 which is insulated from the other parts of the arm. The arm is mechanically coupled with the core 73 of a solenoid 74 so that when the solenoid is made active, it will be moved from the position shown in Fig. 5 to the opposite circuit closing position, wherein the circuit between contacts 68 and 70 is broken, and that between 69 and 71 is made. A spring 75 reacting between the arm and said solenoid normally holds the arm in the position shown.

A latch bar 76 is pivotally connected to switch arm 66 and is arranged to slide in a stationary guide 77, having a shoulder 78 which abuts against the guide to arrest the arm when positioned, as shown by Fig. 5, under thrust of spring 75. Latch bar 76 is provided with a latch shoulder 79, beveled on one side, which is adapted to pass over a locking stud 80 on the manually controlled lever 39, being raised by the stud in passing, and to be interlocked with said stud by dropping back of it after passing it. Guide 77 permits such rise. A spring 81 normally holds lever 39 elevated as shown and raises it after it has been depressed by the operator's manipulation of handle 35.

Switch lever 66 also controls the circuit of an alarm signal device through a switch composed of contact members 82 and 83 which are separated when the switch arm is in the position shown in Fig. 5 and are brought together when the arm moves to its opposite position. As here shown, contact 82 projects from the arm, and contact 83 is slidingly mounted, and pressed on by spring 84, in a guide 85 of insulating material secured to plate 37. Conductors may be connected with the contacts as shown. These details, however, may be widely modified and departed from within the scope of the invention.

The coin slot 34, previously mentioned, is the orifice of a coin chute or guide 86 which opens through the wall 33 and leads downward within the upper part of the post to a box 87. On one side of the coin chute is a bracket 87a supporting a pivoted arm 88 which is pressed by a spring 89 toward the adjacent side of the chute and carries a gate or stop member 90 protruding into the chute far enough to arrest coins dropped therein. This arm carries a projecting flat faced finger 91 in the path of a stud 92 on the manual lever 39, so arranged that when said lever is depressed, the gate will be withdrawn and any coin which may be resting on it will be released. Above the gate are spring contact members 93 and 94 mounted at opposite sides of the chute on insulating blocks, and extending into the chute with a separation between their nearest points somewhat less than the thickness of the coin intended to be used with the apparatus.

I will now explain the mode of operating the apparatus as thus far described, for the purpose of signaling the right or wrong use of the parking privilege, (referring in so doing to the electrical diagram in Fig. 14), before describing the recording phase of the invention.

The automobile, in coming into the parking berth, presses on the switch actuator 2 and shifts the main switch contact 23 away from contact 21, with which it is normally in engagement, and into engagement with contact 20. Current then flows from the positive side L of the supply circuit through the connecting conductor 31, contact 20 and conductor a to the solenoid 74, and thence by conductor b to contact 63, with which the switch element 61 is then in engagement, and so through conductor 65 to the negative side L' of the line, or to ground. Solenoid 74 then pulls switch lever 66 from the position shown in the drawings, to the opposite side, whereby the circuit is closed between contacts 69 and 71; and the arm is then locked in the displaced position by latch elements 79 and 80. The circuit is thus completed through the signal R and conductor c with the return line or ground. It may be assumed that signal R is a red light and that its conventional meaning is to show that payment is due for the parking privilege now being used. At the time of closing contacts 69 and 71 together, contact 68 was withdrawn from 70, thereby opening a gap in the circuit of the signal G which is connected with contact 70 and the wire c.

In order to discontinue signal R and put signal G (preferably a green light) into operation, the car operator puts a coin in the slot 34 and then moves the knob 35 downward as far as it will go. The coin bridges the gap between contacts 93 and 94, thereby completing a circuit from the power line through conductors d, e, f, g, solenoid winding 50, and conductors h and i to the return line or ground. Solenoid 50 thereupon automatically withdraws stop lever 45 from the path of stop bar 42, leaving the knob free to be moved. When the operator moves it, he thereby first releases the lock 79 and 80, then withdraws the gate 90 from the chute, so that the coin falls into the receptacle 87. As soon as the lock has been released, spring 75 throws switch arm 66 back to first position, wherein it closes the break between 68 and 70 in the circuit of the green light and opens the circuit of the red light between 69 and 71. After thus depressing knob 35, the operator releases it, whereupon spring 81 returns lever 39.

It will be noted that the main switch controls both signal lights, and that neither can be lighted if the circuit is closed between contacts 21 and 23 of that switch, but that either may be lighted when the contacts 23 and 20 are together, depending on the position of the signal changing switch member 66.

In the movement of stop lever 45 which leaves knob 35 free to be moved, the circuit of solenoid 74 is broken by separation of contact 61 from 63, whereby that solenoid becomes dead and spring 75 is able to move the arm 66 as described, upon withdrawal of stud 80 from latch shoulder 79. At the same time the contacts 62 and 64 are brought together, which closes a gap in the circuit from the main switch contact 21 through conductors j, k, solenoid winding 57 and conductor 65 to ground, but the solenoid is not energized because the circuit is interrupted at contact 21. The stop lever is locked in this position by latch 51, so that it remains there after the circuit of solenoid 50 has been opened by the coin leaving contacts 93 and 94.

At any time during the continuance of this condition the operator may remove the car without hindrance, and when he does so, the main switch automatically shifts from contact 20 to contact 21, putting out the green light and completing the circuit of solenoid 57, which releases latch 51 and allows the stop lever to be returned by its spring 47 to obstructing position; the parts being then all restored to the normal position. As an additional safeguard against an attempt of a dishonest operator to leave without making payment, I have provided an alarm signal 95 in circuit with the switch contacts 82, 83, with the main switch contact 21 through conductors $j$, $l$ and $m$, and with the return line through conductors $n$ and $i$. This alarm signal may be an electric bell, gong or horn, or any other conspicuous signal device mounted at any convenient point in or on the post, or elsewhere, or it may be an annunciator at some station or office which is occupied by the guardian of the parking location. It is made potentially operative by closing of the switch 82, 83 by automatic movement of the switch control arm 66 when the car is parked, as previously described, and becomes fully operative if the car is withdrawn without the required payment having been made. But when the payment has been made, it is rendered inoperative by automatic return of the switch control arm into the position for completing the circuit of the green signal light.

Figure 14:
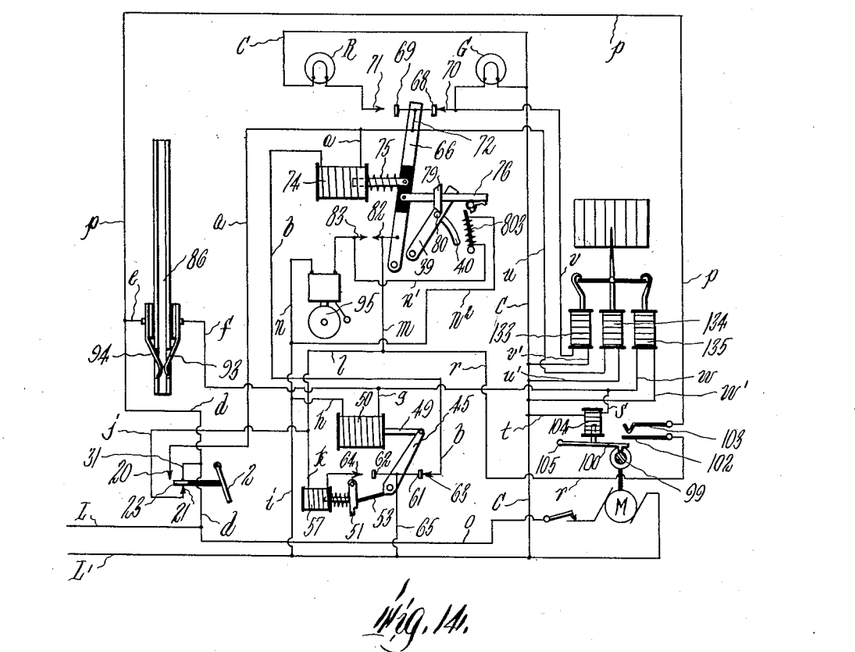
Fig. 14 is a diagram of electrical parts and connections, showing their functional relationship to the mechanical parts.

To prevent the alarm signal from continuing to operate indefinitely when the driver leaves the parking berth without payment, I have provided for automatically breaking the circuit between the switch contacts 82 and 83 after a predetermined lapse of time. This is done by releasing the latch shoulder 79 from its engagement with the locking stud 80, which occurred when the main switch was first closed by placement of the automobile in the parking berth. Referring to Figs. 5 and 14, a trigger lever 801 is pivoted to the base of guide 77 with one arm underlying the free end part of latch bar 76 and resting on a stop 802. The short arm of the trigger lever is adjacent to the free end of a bimetallic bar 803 which is rigidly secured at its other end to a stud 804 projecting from the plate 37. The bimetallic bar, made of a strip of steel and a strip of brass (or other metals having respectively different coefficients of expansion) soldered or brazed together throughout their length, is clear of the trigger lever at ordinary temperatures, but is flexed by heat so as to raise the latch bar, by means of the trigger lever, until the latch shoulder 70 is disengaged from locking stud 80. Thereupon the switch lever 66 is shifted by spring 75 and the contact 82 withdrawn from contact 83, breaking the alarm circuit.

Heat for thus flexing the bar is generated by a coil 805 of resistance wire surrounding the bar and connected in shunt circuit with the alarm signal by conductors $n'$ and $n^2$, (Fig. 14). When the alarm circuit is closed, current flows also through the heating coil and, after a time which may be of any desired duration, determined by the design of the bar and heating coil according to known principles, causes the bar to act with the effect above described. Opening of the switch 82, 83, then occurring, breaks the heating circuit as well as the alarm circuit and the heating coil immediately cools off.

It will be understood that this automatic discontinuance of the alarm is an optional feature which may be omitted within the broad scope of the invention, or for which may be substituted automatic means of different character, or manual means for stopping the alarm and returning, or permitting return of, the switch arm 66 to normal position. Evidently the heating coil, or other equivalent latch releaser may be connected in series rather than in parallel with the alarm signal.

The apparatus as thus far described is adapted to permit unlimited parking upon deposit of a coin or token having the value of the prescribed fee. But it is part of my purpose to set a time limit on the privilege purchased by a single payment. To that end I have provided an electric motor M in the main circuit L, $o$, L'. Such motor is preferably one of the self starting synchronous running type and may be an electric clock. It is mechanically connected by speed reducing gearing 96, 97, and intermediate gearing 97$a$, 97$b$, 97$c$, 97$d$, (Figs. 8 and 11), with a shaft 98 on which is a short screw or worm 99. This worm moves the part 100 of a compound lever 100, 101, so as to bring together normally separated switch contacts 102 and 103 which are connected in the circuit of solenoid 57 through conductors $d$, $p$, $r$, $l$ and $k$. When switch 102, 103 is closed (contacts 62, 64 being then together and stop lever 45 being held displaced by latch 51), the signal is changed from green to red by shifting of the stop lever 45, and its connected contacts 61 and 62, and the resulting action of solenoid 74, which then becomes active and moves the switch shifter arm 66 in the same way as when the car was first parked. Payment for a further period may be then made and signaled in the same way as the first payment. Lever 100—101 is controlled by a solenoid 104 which is in circuit with the coin controlled switch contact 93 by the conductors $f$ and $s$, and with the return side of the circuit by conductors $t$ and $c$, whereby it is made active whenever a coin is dropped into the chute. Part 101 of the lever is coupled with the core of solenoid 104 and pivoted at 105 so as to swing toward and away from the worm 99. It is withdrawn therefrom by the magnetic force of the solenoid and thrust toward the worm by a spring 106. Part 100 is pivoted to the part 101 at 107 so as to swing in a plane parallel with the shaft 98, and carries a stud 108 which is adapted to enter the space between any two of the threads of the worm. Such threads are preferably multiple and beveled outwardly to a narrow edge, and the stud is also beveled to an edge in order to shorten to a minimum the time needed to mesh the stud with the worm after having been withdrawn. It will be apparent from a comparison of Figs. 11, 12 and 13 that, when arm 101 is withdrawn by the solenoid, the part 100 will drop by gravity to the limit permitted by its stop finger 109, whereupon stud 108 is brought beside a low point on the worm. On release of the arm by the solenoid, stud 108 is engaged with the worm and the lever part 100 is then gradually raised until a finger 110 on its extremity moves switch contact 102 against complemental contact 103; the stud then resting on the upper end of the worm until again withdrawn by the solenoid. The length of the worm, the lead of its thread, and the rate of its rotation are made of such values as will allow lapse of any prescribed time between engagement of the stud with the worm and closing of the switch. For example, this time may be an hour or any other desired period.

I have also made provision for keeping a record of the operations performed in parking the car, or a succession of cars; i. e., the time of arrival and departure of the car, times of payment, etc. The recording means here shown is organized to make such a record throughout an entire week. It comprises a frame consisting of plates 111, 112 and connecting cross rods 113, which is mounted in any suitable way within the post in a location clear of the signal controlling apparatus previously described. The motor M, shaft 98, and switch controlling mechanism last described are mounted on this frame. At the upper end of the frame a drum 114 is mounted rotatably on one of the cross rods, where its upper side is near the cover of the post and accessible through an opening 115 in the cover, which is normally closed by a door or shutter 116 controlled by a lock or latch 117. Such lock may be controlled by a special key, or automatically by the signal controlling means in the manner later described in connection with Figs. 16 and 19. The object of this opening is to enable the car operator to inscribe the registration number of his car, or his name, or both, on the record sheet. The drum is rotated by shaft 97 through gearing 118, 119 and 120 at a rate of one revolution in twenty-four hours. It is surrounded by a record tape or band 121 divided transversely into subdivisions for the several days of the week, and longitudinally into equal subdivisions for the twenty-four hours of the day, which is drawn from a supply roll or case 122. A marker 124 is carried on the extremity of an arm 125 which is connected by a pivot 126 between uprights 127 on a plate 128 which is coupled by lugs and pivots 129 with a carriage 130. The axis of pivots 129 is parallel to the drum, whereby the marker may be brought against the record sheet and withdrawn, and pivot 126 is transverse to the drum to permit movement of the marker back and forth longitudinally thereof. Springs 131 tend to raise plate 128, withdrawing the marker, and springs 132 tend to hold marker arm 125 central with respect to the support 127. Three solenoids 133, 134 and 135 are supported by a bracket or ledge 136 on the carriage. The cores of these solenoids extend from their upper ends and are connected respectively with levers 137, 138 and 139, all of which are pivoted on a common rod 140 on the carriage, and each of which has a curved arm 141 extending upward and back over the edge of plate 128. Thus when any of the solenoids is rendered active the marker is brought into engagement with the record sheet. The cores of the outer solenoids 133 and 135 are connected by cords or links 142 and 143 respectively with lateral projections or arms 144 and 145 on the marker arm 125; wherefore actuation of solenoid 133 moves the marker to the left, and of 135 moves it to the right (with respect to Fig. 8) as well as against the record sheet. In this illustration the connecting members 142 and 143 are flexible cords attached to the pivot pins which connect the solenoid cores with their respective levers 137 and 139.

Figures 8, 9, 10:
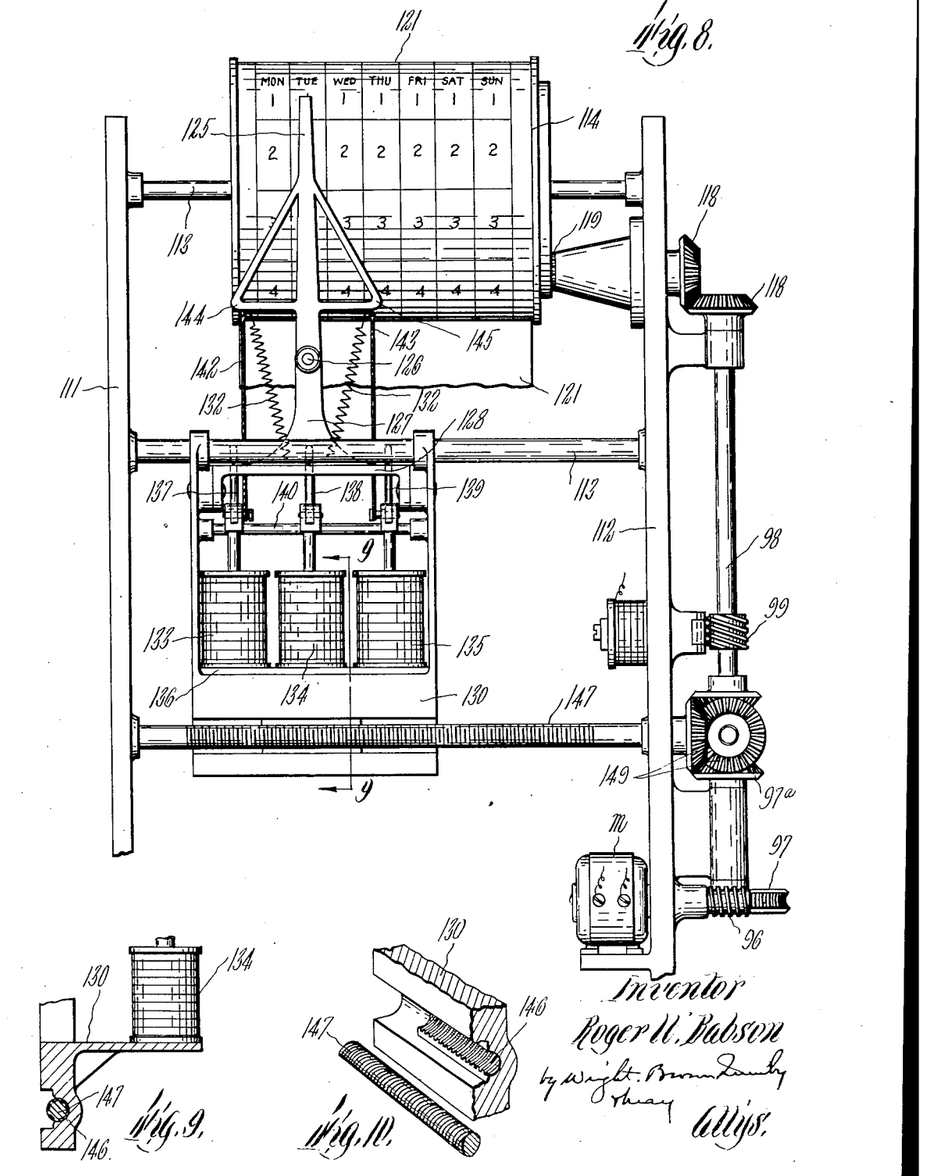
Fig. 8 is an elevation of the recording mechanism contained within the post.
Fig. 9 is a detail sectional view taken on line 9—9 of Fig. 8.
Fig. 10 is a fragmentary perspective view of the screw and half nut by which the marker of the recording means and the controllers therefor are moved transversely of the record sheet.
Figure 15:
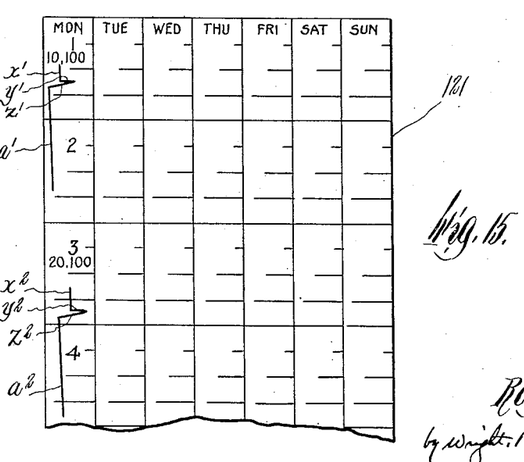
Fig. 15 is a fragment of a record.

The particular record sheet shown in Figs. 8 and 15 is designed to exhibit the record marking with its parts relating to different days in different parts of the width of the sheet. To that end the paper is ruled in parallel columns of equal width, each appropriated to one of a number of successive days, and the marker is shifted sidewise continuously by the width of a column each twenty-four hours. Carriage 130 is adapted to slide sidewise on one of the cross rods 113 and carries on its lower end a half nut 146 (Fig. 10) adapted to engage the threads of a screw 147 mounted in the frame plates 111 and 112 parallel to the guide rod 113. In the construction shown, gravity alone furnishes all the force necessary to maintain engagement of the nut with the screw, permitting it to be readily disengaged when the carriage needs to be reset at the beginning point of its travel. The screw is rotated from the motor M through the gearing 96, 97, 97a and 97b previously described, a shaft 148 on which 97b is secured, and a bevel gear pair 149, one member of which is on shaft 148 and the other on the screw. The speed of rotation of the screw and the lead of its thread are designed with the proper values to shift the carriage across the entire width of the record sheet in the number of days covered by the record. The sheet is divided by horizontal lines into spaces of hours, or fractions of hours, each time space having a length equal to the distance traveled by the sheet in that length of time.

With the arrangement just described, if the marker were held constantly against the drum, it would draw a straight diagonal line from the upper left hand corner of the chart to the lower right hand corner, crossing the divisions between the adjacent columns at successive twenty-four hour intervals; making the records for successive days in tandem. However, it is within my contemplation to wrap the paper around the drum and secure it. In that case, the drum having a circumference equal to the length of the chart, and rotating once in twenty-four hours, the records for successive days would be made beside one another in the parallel columns. And with no other changes than of dimensions, speed of rotation of the drum, and rate of traverse of the marker carriage, records for successive twelve hour periods, or periods of any other prescribed length of time, may likewise be made beside one another in parallel columns. That is, separate columns may be made for the forenoon and afternoon records of each day.

The motor which governs the timing and recording phases of the invention may obviously be run either continuously or with interruptions for periods when parking is not permitted. For instance, if parking on a certain street, or on one side of a street, is permitted during part of a day and prohibited at times when the traffic is heavy, the motors of the machines at such places might be stopped under automatic or manual control, or disconnected from the driven mechanism, either automatically or manually, during the prohibited periods; and restarted or reconnected at the end of such periods.

Referring to the electrical diagram in Fig. 14, it will be seen that solenoid 134 is connected by conductors $a$ and $u$ with the main switch contact 20, and by conductors $u'$ and $c$ with ground or the return line of the circuit; that solenoid 133 is connected by conductor $v$ with switch contact 70 which controls signal $g$, and by conductor $v'$ with the return line; and that solenoid 135 is connected by conductors $f$ and $w$ with which the coin controlled switch contact 93 and by conductor $w'$ with the return side of the circuit. Thus when the main switch is closed by the automobile in the parking berth, a mark such as those shown at $x'$ and $x^2$, is made on the record chart which is continued lengthwise of the latter until a coin is placed in the slot. This causes solenoid 135 to be operated and the marker to be shifted to the right, making a mark such as those shown at $y'$ and $y^2$. When the car operator thereafter pulls down the handle 35, solenoid 133 is energized by closing the switch 68, 70 and solenoid 135 is deenergized by passing of the coin out of the chute; whereupon the marker is moved to the left and makes a mark such as $z'$ or $z^2$. Thereafter, as long as the car remains in the parking space, and until the parking time paid for has expired, the marker traces a line as $a'$ or $a^2$, longitudinally of the chart with an inclination toward the right. When the car leaves the berth, all the solenoid circuits are broken and the marker is withdrawn from the chart. The inscriptions placed on the record by car operators appear above the markings thus automatically made, as shown by the registration numbers 10,100 and 20,100 illustrated in Fig. 15.

Subsequent payments while the car remains in the berth are recorded by similar offsets to $y'$ and $z'$ made without a break otherwise in the continuity of lines such as $a'$ and $x'$, but an open space between such lines shows that the berth has remained unoccupied for a time corresponding to the length of the interruption. If the driver fails to make payment this fact is shown by the record as well as by the visible signal; while if he deposits the coin but omits to pull down the handle, this fact is shown on the record by a longitudinal line extending from the right hand end of a transverse mark such as $y'$, and shows that, notwithstanding the indication of the visible signal, the driver was not delinquent.

Figure 16:
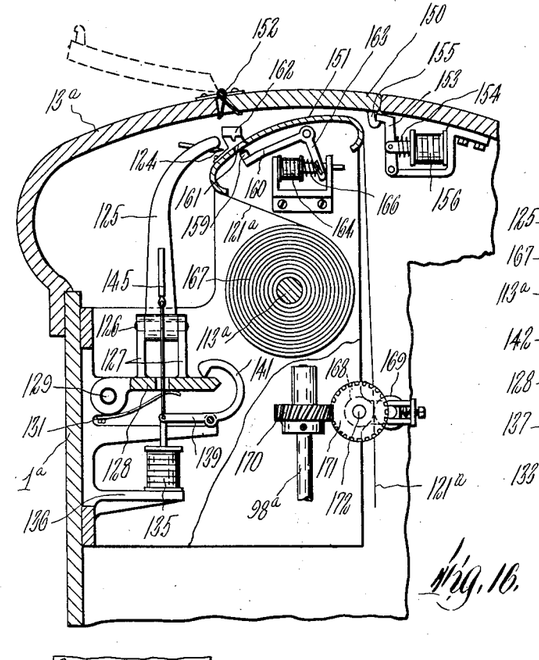
Fig. 16 is a view similar to Fig. 11 showing a variant of the recording means.
Figure 17:
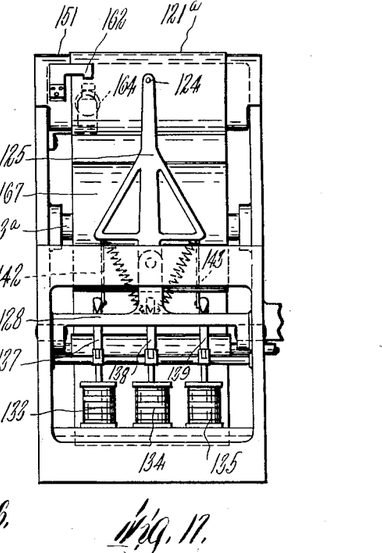
Fig. 17 is an elevation of the recording means shown in Fig. 16.
Figures 18, 19:
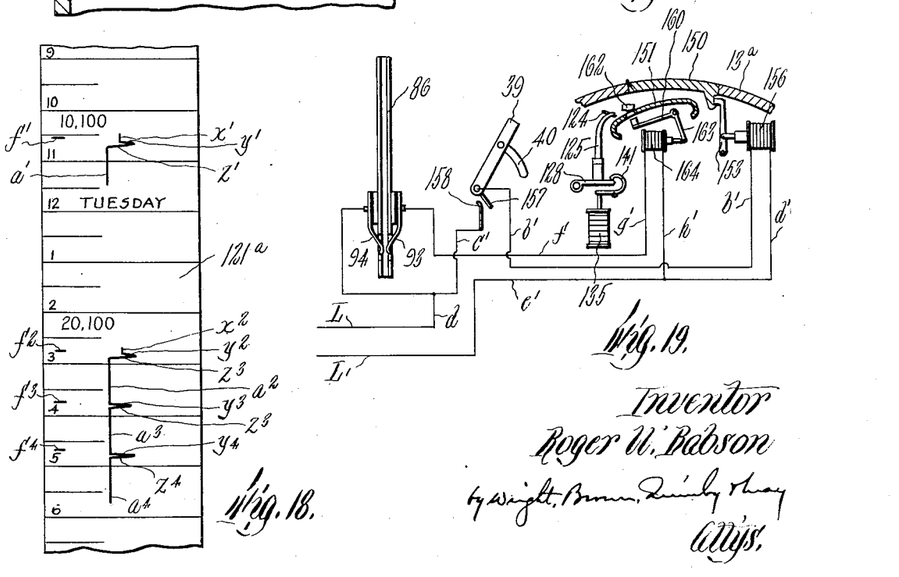
Fig. 18 shows a fragment of the record produced by this means.
Fig. 19 is an electrical diagram of the controls for the additional elements illustrated in Fig. 16.

Figs. 16–18 show a modification of the recording means in which the laterally movable marker carriage is omitted, the marker is held in a fixed location on the supporting frame, and the record chart is a long tape whereon the records for the several days follow one another in the same column. In this connection there is also illustrated automatic means set into action by or in consequence of the deposit of a coin, for enabling the operator to write his registration number and/or name, or any other appropriate information, on the record. This is the automatic means previously referred to, which may be applied equally well to the latching means for the door 116 shown in Fig. 11. The specific information given by the present illustration is that the driver of car number 10,100 parked just after 10:30 Monday night, paid the required fee, and left within the hour; and that the driver of car 20,100 entered the same berth at 3 A. M. Wednesday, paid fees then, and at the end of each of the following two hours, and left before the end of the third hour.

A door 150 is provided in the top of the post directly above the table 151 on which the record tape is supported. It is fitted with a spring 152 tending to throw it open, and is normally locked by a latch 153 which is projected by a spring 154 into the notch of a lug 155 on the door and is coupled with the core of a solenoid 156 so as to be released when the solenoid is energized. The solenoid winding is connected, as shown in Fig. 19, by conductor $b'$ with a switch contact 157 carried by the manually operated lever 39, the complemental contact 158 of which is connected with the positive side of the current source through the conductor $d$ previously described and a conductor $c'$. The terminal of the solenoid is connected by conductors $d'$ and $e'$ with the negative side of the circuit. Thus when the operator pulls down the handle of lever 39 the door is released and flies open, and the record is exposed for inscription on it of the operator's registration number or name, or both.

The additional distinctive marks made when a coin is deposited are shown at $f'$, $f^2$, $f^3$ and $f^4$ in Fig. 18. They are made by a striker 159 carried by a lever 160 beneath the table 151, in a location beside the marker 124 and adapted to pass through a hole 161 and lift the paper against a narrow slit orifice of a nozzle protruding from the bottom of an ink fount 162 which is secured to the table near one end (Fig. 17) and overhangs the edge of the record tape. An arm 163 is coupled by a pin and slot connection with the core of a solenoid 164 and the striker is normally withdrawn from the paper by the joint action of gravity and a spring 166 confined between the solenoid spool and arm 163. The terminals of the solenoid winding are connected by a conductor $g'$ with the conductor $f$ leading from the coin controlled switch, and by conductors $h'$ and $e'$ with the return side of the circuit. Thus when the coin is deposited, the striker is displaced to press the paper against the nozzle of the ink fount, from which the paper is normally separated. It will be understood that the nozzle orifice is so narrow as to prevent dripping of ink on the paper. This form of marking means may be replaced by equivalent means of specifically different character. It is preferably located beside the marker 124 on the same line perpendicular to the length of the record sheet, as indicated by the marks shown in Fig. 18, although in Fig. 16 it is represented, for clearness of illustration, as displaced along the tape. However, it may be placed anywhere and its indications read with due allowance for its known distance of displacement from the other markings on the sheet.

Fig. 16 shows also an alternative means for driving the record tape occasioned by the fact that it may be of great length and that its support is a stationary table. It is provided on a supply spool 167 mounted on a cross rod 113a of the marker supporting frame, and is driven by a pair of rolls 168 and 169 between which it passes. Roll 169 is spring pressed toward the other and against the tape, while roll 168 is positively driven by helical gears 170 and 171, the former being on a shaft 98a, corresponding to shaft 98 of the preceding description, and the other being on shaft 172 of the roll. In all other respects the recording means and the parts thereof are like the means previously described and are designated by the same reference characters, except only that the record tape, being specifically different from the chart 121, is designated as 121a. The diagram Fig. 19 is intended to show additions to, not substitutions for, the elements shown in Fig. 14. It is to be understood that these additions are used in conjunction with the signal- and record-controlling devices shown in Fig. 14 and previously described.

I have previously remarked that variations may be made in the form and structure of the post and of the main switch and its actuator. One of such variations in each of these items is shown by Figs. 20–23 inclusive. In this modification the column or post is taller and more slender than the one first described, and the signal lights are mounted outside of its top, the lamp bulbs being surrounded by appropriately colored lenses 173 and 174 similar to those used with marine lanterns, and clamped by covers 175 of water shedding construction, which are secured by rods 176 to lugs within the openings in the cover piece 13a of the post through which wires pass to the signal lamps. The main body 1a of the post is a hollow cylinder set into a massive base 8a, and the joint is calked with lead.

The switch actuator is a massive bar 177 connected by a pivot 178 to an inwardly projecting lug on a frame 179 secured to the side of the body 1a over an upright opening therein. The lower end of the actuator bar has tongue 180 back of the lower member of the frame, and its central part is of convex form so as to protrude outward from the frame far enough to allow substantial movement of the automobile bumper when pressing against it before the bumper comes to bear on the post itself.

The main switch is essentially like that shown in Fig. 4 and its parts are designated by the same reference characters. Its only substantial difference is in its position, being hung vertically from a bracket 181 fastened to the inside of the post. Its telescopic slide 22 is pivoted to an arm 182 which is pivoted also to the bar 177 and carries on its opposite end a roll 183 adapted to run along a vertical trackway 184 on the inside of the post body opposite to bar 177. A spring 185 connected under tension with bracket 181 and arm 182 normally holds the switch with its contacts 21 and 23 in engagement and holds the actuator bar in its outermost position. Arm 182 is so long that it cannot take a position perpendicular to the bar 177, but is inclined to the direction in which its point of connection with the bar moves. In other words, the distance from such point of connection to the circumference of roll 183 is greater than the perpendicular distance from the same point to the trackway. Hence the bar is never locked in its protruded position, but is free to be displaced by sufficient inward pressure. However, the pressure required for that purpose is considerable; enough to prevent ordinary mischievous tampering with the switch, but easily applied by an automobile. The slope of the roadway toward the curb is availed of for this purpose. This is an important factor in all situations where the roadway has a slope downward toward the location of the post in the area available for parking, whatever may be the specific design of the post and switch actuator, as it applies the force of gravity to insure a sufficient pressure of the automobile bumper against the switch actuator, and a sufficient movement of the latter to operate the register, regardless of the care or lack of care of the driver in bringing the car to a standstill. It will be apparent that as the bar is moved inward, arm 82 is swung downward, shifting switch contact 23 from 21 to 20, with the effects previously described.

The recording and signal controlling means are mounted at any convenient locations in the post. Fig. 21 shows the coin slot 34 and the manually controlled handle 35 in one side near the top of the column.

The term "coin" as used herein, unless otherwise qualified by the context, means any token, check, ticket or other object having universal value or a conventional value for the specific use of this machine, capable of being placed in the machine and of closing a circuit directly or indirectly, or releasing a trip so that motive mechanism may do the work required.

What I claim and desire to secure by Letters Patent is:

1. A parking register comprising a post, an actuator mounted on said post in position to be displaced by a contacting part of an automobile in parking position adjacent to the post, an indicator, indicator controlling means, and means whereby the indicator controlling means is set into action by such displacement of said actuator.

2. A parking register comprising a post, an actuator movably mounted on the post and normally protruding therefrom, adapted to be moved inward with respect to the post by pressure applied by an automobile parked adjacent to the post, and signal controlling means operable by such movement of the actuator.

3. A parking indicator comprising a post adjacent to a parking location for automobiles, an actuator pivoted to said post and normally protruding therefrom in position to be pressed upon and displaced by the bumper of an automobile parked in such location, and signal controlling means operable by such displacement of the actuator.

4. A parking register comprising a hollow post, signal controlling means located within the post, and an actuator for said controlling means pivoted to the post and normally protruding therefrom at a height adapting it to be engaged and moved inward by the bumper of an automobile placed adjacent to the post.

5. A parking register comprising a post, an actuator mounted on said post with provision for movement outward and inward with respect thereto at a height such that it may be engaged and shifted by the bumper of an automobile approaching the post, said actuator having rollers arranged to receive on their surfaces the thrust of such a bumper; combined with signal controlling means operable by said actuator when so moved.

6. A parking register comprising a post, an actuator hinged to the post in the manner of a door on a vertical axis at a height adapting it to be engaged by the bumper of an automobile approaching the post, rollers mounted adjacent to the free edge and between such edge and the hinge axis of the actuator with their axes substantially vertical and their sides protruding for engagement directly with such bumper, and signal controlling means operable by the actuator when pressed upon by the automobile bumper.

7. A parking register comprising a post, an electric switch within the post comprising one member attached to the post and a second member slidably engaged with the first member, and an actuator mounted on the post with provision for movement in and out at a height adapting it to be engaged by the bumper of an automobile approaching the post, coupling means between said actuator and the second named member of the switch, a spring reacting between the actuator and post tending to place and retain the actuator in a protruded position, and signal controlling means operable by closing of the switch by inward movement of the actuator.

8. A parking register comprising a post, an actuator pivoted to the side of the post adapted to swing in and out and having a protruding portion at a height to be engaged by the bumper of an automobile approaching the post, and an electric switch within the post comprising one member pivotally connected to the post and a complemental sliding member, coupling means between said sliding member and the actuator, a spring connected to said coupling means and the post tending to hold the actuator in a protruded position and the sliding switch member in open circuit position, the switch members having complemental circuit closing contacts engageable when the actuator is pressed inward, and signal controlling means operable upon closing of such switch contacts.

9. A parking register comprising a post, a switch actuator hinged to the post in the manner of a door to swing outwardly therefrom at a height enabling it to be pressed upon by the bumper of an automobile approaching the post, a switch comprising telescopically slidable members, one of which is pivoted to the post, a link connecting the other of said members to the actuator, a guide link pivoted to the post and to the point of connection between said link and the second switch member, a spring connected to said guide link and the post and arranged to exert force normally holding the actuator in its outward position, the members of the switch having complemental circuit closing contacts which are separated when the actuator is in the outward position and are brought into contact when the actuator is moved inward, and electrical signal controlling means operable by bringing together of said switch contacts.

10. A parking register comprising a post having an opening in one side, a switch actuator pivoted to the post inside the opening and having a part protruding through the opening at a height enabling it to be engaged and pressed inward by the bumper of an automobile approaching the post, a trackway within the column opposite to the actuator, an arm pivoted to the column extending across to the trackway at an inclination to the path in which said point of connection travels when the actuator is moved, a spring connected to said arm and anchored in the post to exert force on said arm tending to move it so that its reaction on the trackway forces the actuator outward, complemental switch members connected to said arm and to the post respectively, being in open circuit position when the actuator is thus protruded and into circuit closing position by displacement of the arm when the actuator is moved inward, and signal controlling means in circuit with said switch members.

11. In a parking register having a plurality of signals, means operated by an automobile in parking position for causing one of said signals to act, coin controlled means operable by deposit of a coin for enabling a different signal to act, and means for causing action of said different signal.

12. A parking register comprising a plurality of electric signals in different circuits, a signal changing switch shiftable to close one or another of said signal circuits exclusively, a main switch operable by placement of an automobile in parking position, means whereby such operation of the main switch causes the signal changing switch to be placed in one of its positions, a coin controlled switch, and means under the control of said coin controlled switch for causing placement of the signal changing switch into another of its signal operating positions.

13. A parking register comprising a normally open main switch located in relation to a parking berth for engagement and shifting into circuit closing position by a parked automobile, a plurality of signals, a signal changing switch placeable in different positions, in each of which it causes one of said signals to be put in action and another signal to be put out of action, means operable by closing of the main switch for putting said signal changing switch into one of said positions, a lock for holding the signal changing switch in said position, a manually operable releaser for said lock, an obstructor to prevent operation of said releaser, and coin controlled means for clearing said obstructor from the releaser when a coin is deposited.

14. A parking register comprising a signal, an actuator operable by an automobile placed in parking position to put said signal into action, a second signal, means controlled by deposit of a coin in the register for putting said second signal into action and simultaneously disconnecting the first signal, a third signal, and means operable by said actuator when the automobile is withdrawn from the parking position, and when no coin has been deposited, for putting the third signal into action.

15. A parking register comprising an actuator operable by an automobile placed in parking position, a plurality of electric circuits, a main switch movable by such operation of said actuator to close one of said circuits and open a second one of said circuits, means for shifting the actuator and main switch to close the second circuit and break the first circuit, when the automobile leaves the parking position; a signal, means operated by closing of the first circuit for operating said signal means operated at the same time for closing a normally open gap in the second circuit, and an alarm signal in the second circuit which is set into action when the main switch is placed in position to close the second circuit and the last named gap is closed at the same time.

16. A parking register comprising a signal actuator operable by the bumper of a parked car, a signal, and means for putting said signal into action when said actuator is so operated, a second signal, coin controlled and operator-manipulated means operable in conjunction with one another when a coin is deposited for putting the first signal out of action and the second signal into action, a third signal, and means for putting said third signal into action when the parked car is removed without deposit of a coin and without operation of said operator-manipulated means.

17. A parking register as set forth in claim 16, including also automatic means for discontinuing the action of said third signal after a predetermined lapse of time.

18. A parking register comprising a plurality of electric signals, a signal changing switch shiftable into one position for closing the circuit of one signal and opening that of a second signal, into a second position where it closes the circuit of the second signal while opening that of the first signal, electromagnetic means connected with said switch and operable when made active to place the switch in the first named position, the switch being otherwise normally in the second position, a main switch shiftable by an automobile placed in parking position to close the circuit of said electromagnetic means, a coin operated switch, and means operated by closing of said coin operated switch for breaking the circuit of said electromagnetic means, whereby the circuit changing switch is enabled to return to its second position, and means for so returning the circuit changing switch.

19. A parking register comprising a plurality of electric signals, a signal changing switch shiftable into one position for closing the circuit of one signal and opening that of a second signal, and into a second position where it closes the circuit of the second signal while opening that of the first signal, electromagnetic means connected with said switch and operable when made active to place the switch in the first named position, the switch being otherwise normally in the second position, a main switch shiftable by an automobile placed in parking position to close the circuit of said electromagnetic means, a latch for holding the circuit changing switch in said position, coin controlled means operable by deposit of a coin in the register for breaking the circuit of said electromagnetic means, a manually operated device for releasing said lock, whereby the circuit changing switch is enabled to return to normal position, and means for so returning the circuit changing switch.

20. A parking register as set forth in claim 19 and including also a latch for maintaining the circuit of said electromagnetic means in open condition after being broken, a timing means, connections through which the timing means releases the last named latch, and means for then closing said circuit.

21. A parking payment register for automobiles comprising a signal, means operable by the pressure of an automobile placed in parking position for operating said signal, a second signal, other means controlled by deposit of a coin in the register for discontinuing the first named signal and operating said second signal, a timing means, and means operated thereby for discontinuing the second signal at the end of a predetermined time period and actuating again the first signal.

22. A parking payment register comprising a plurality of signals, a switch controlling said signals, an electromagnetic actuator coupled with said switch, a main switch engageable and operable by an automobile when placed in parking position to close the circuit of said electromagnetic actuator and cause operation thereof for shifting the signal changing switch into closed circuit relation with one signal and open circuit relation with a second signal, a coin controlled switch closable by a coin deposited in the register, an electromagnetic device in circuit with said coin controlled switch and made active by closing thereof, a circuit breaker in the circuit of the first electromagnetic device which opens the circuit thereof when the second electromagnetic device is made active, a third electromagnetic device having a circuit closing switch arranged to be closed by said circuit breaker when the latter is operated as above set forth, a latch for holding said circuit breaker in the relation last described, a normally open switch in circuit with said third electromagnetic device, timing means for closing the last named switch after lapse of a given time from the opening thereof; the third electromagnetic device having means for releasing said latch whereby said circuit breaker is caused to close the circuit of the first electromagnetic device and open that of the third electromagnetic device, and means by which deposit of a coin in the register initiates operation of said timing means.

23. A register as set forth in claim 22 in which the timing means comprises a progressively movable and returnable switch closing element, including also an electromagnetic device in circuit with the coin controlled switch for causing said switch closing element to be reset in starting position when the coin controlled switch is closed.

24. In a parking register, a signal for showing withdrawal of a parked car without payment, an electric circuit for operating said signal having two openings in series, a switch for one of said openings, means operated by placement of the car in parking location for causing said switch to close the circuit opening controlled by it, a latch for holding the switch in circuit closing position, a switch operated by withdrawal of the car for closing the second opening in the circuit, whereby said signal then becomes operative, a normally inoperative heat governed tripper adapted to cause release of said latch when made operative by heat application and an electric heating unit in circuit with said switches to be rendered active when both switches are closed and arranged to generate heat then in such proximity to said tripper that the tripper is caused to release the latch.

25. A parking register comprising a main actuator movable by a car arriving in parking location, a coin receiver, an electric signal, a circuit closing switch for said signal, an electric switch operable by deposit of a coin in said receiver, a manual actuator, means controlled by said main actuator, said coin operated switch and said manual actuator, when operated in succession for causing said signal to become active, means for supporting and propelling a record chart, a marker for inscribing said chart, normally separated therefrom, means whereby the said movement of the main actuator causes the marker to bear on the chart, means whereby closing of the coin controlled switch gives a distinctive movement to the marker, and means whereby closing of said circuit closing switch causes a different distinctive movement to be given the marker.

26. A parking register comprising an electric signal, a circuit closing switch for said signal, yieldable means normally holding said switch in circuit closing position, a main switch closable by movement imparted to it by a car being placed in parking location, means operated by closing of the main switch for shifting the signal controlling switch into position to open the circuit of said signal, a coin operated switch, means whereby closing of said coin operated switch permits the signal controlling switch to be placed in circuit closing position, means for supporting and propelling a record chart, and means controlled respectively by each of the before described switches for causing distinctive marks to be made on the chart when the respective switches are closed.

27. An automobile parking signal system comprising a post located adjacent to a parking berth above the ground level, an actuator movably mounted on said post in position to be pressed upon and displaced by a portion of an automobile parked in such berth, a plurality of signal devices, signal changing means, means operable by said actuator when so displaced for putting one of said signals and the signal changing means into action, and means operable by said signal changing means after lapse of a predetermined time for disabling the active signal and putting another signal into action.

28. An automobile parking signal apparatus comprising a plurality of electric signals, electric conductors and switches in circuit with said signals, a post in fixed location adjacent to a berth provided for a parked automobile, a main switch actuator movably mounted on said post in position to be pressed upon and displaced by a portion of such automobile, said actuator when so displaced causing one of the signals to be set into action, a two way electric switch shiftable between circuits in which the several signal devices are separately connected, a timing mechanism, and means controlled by said timing mechanism for shifting said two way switch from one to another of the signal circuits at the end of a predetermined time after actuation of said switch.

29. The combination of a plurality of normally inactive parking signals, a post located adjacent to an automobile parking berth, an actuator mounted movably on said post above the ground level and adapted to be actuated by an automobile placed in such berth and thereby caused to make one of said signals active, a timing mechanism, means for putting said timing mechanism into operation, and means controlled by said timing mechanism for disabling the active signal and putting another signal into action.

30. A coin controlled parking register comprising, in association with a parking berth, means controlled by a car parked in said berth, and by a deposited coin for showing deposit of such coin, an alarm signal, means operated by withdrawal of the car from parked position, when no coin has been deposited, for operating said alarm signal, and means controlled by a deposited coin for preventing operation of the alarm signal.

31. A parking register comprising a signal, means operable by the action of a parked automobile, means operable by a coin deposited in the register and manually operated means, all of the foregoing means being organized and cooperable to put said signal into action, a second signal, means for actuating said second signal by withdrawal of the parked car when no coin has been deposited, and automatic means for limiting the duration of action of the last named signal.

32. In a parking register, a signal, a normally open electric circuit in which said signal is connected, means operable by placement of a car in parking location for closing a break in said circuit, a holder for retaining said last named means in the operative position, a switch in the circuit of said signal in position to be engaged by a part of a parked car and placed thereby in circuit breaking position, means for returning the switch to circuit closing position when the car withdraws, whereby said signal is then put in action, and means rendered operative by withdrawal of the car for releasing and making inactive the said holder after lapse of a time period.

33. A parking indicator comprising, the combination with a parking berth, of an electric signal in association therewith, a main switch and a signal controlling switch in series circuit with one another and with said signal, said main switch being normally in open circuit position, means at the parking berth in position to be actuated by an automobile parked in said berth for putting said main switch in closed circuit position, and timing means for putting said signal controlling switch from an open circuit position into closed circuit position with respect to said signal after lapse of a given time from parking the automobile.

34. A parking indicator comprising the combination with a parking berth, of two signals in association therewith, a signal changing switch shiftable into circuit closing relationship with each of said signals exclusively and being in circuit with said main switch, means at the parking berth in position to be actuated by an automobile parked in said berth for closing said main switch, said signal changing switch being then in closed circuit relation to one of said signals and open circuit relation to the other, a timing mechanism, and means controlled by said timing mechanism for causing shift of said signal changing switch from one to the other of its signal controlling positions at the end of a prescribed period of time after parking of the car.

35. A parking indicator comprising the combination with a parking berth, of a signal associated therewith, a main actuator for said signal at the parking berth in position to be displaced by an automobile there parked, a controller for said signal cooperable with the main actuator to put said signal in operation, a substantially constant speed motor, a timing mechanism driven by said motor and being disconnectible therefrom, means operated by said timing mechanism for causing a signal changing shift of said controller, and coin controlled means for disengaging said timing mechanism from said motor.

36. A parking indicator comprising the combination with a parking berth, of a signal, an actuator at such parking berth movable into a given position by an automobile in being parked in said berth, a controller cooperable with said actuator to put said signal in operation, means for preventing operation of said controller, coin controlled means for disabling said operation preventing means, and timing means under control of a deposited coin for causing said controller to render said signal inoperative after lapse of a given time from deposit of a coin.

37. In a coin controlled signal apparatus having a signal, a controller for such signal shiftable between different positions in which it renders the signal respectively operative and inoperative, a motor, a movable timing device, a disconnectible driving connection between said motor and timing device, means in position to be operated by said timing device at the end of a given extent of movement of the latter to cause shifting of said controller from one to the other of said positions, coin controlled means for disconnecting said driving connection, and means for connecting said driving connection at the beginning of the range of movement of the timing device.

ROGER W. BABSON.